June 16, 1936. H. L. FAIRCLOUGH, JR 2,044,242
SPRING SUSPENSION
Filed April 4, 1934 2 Sheets-Sheet 1
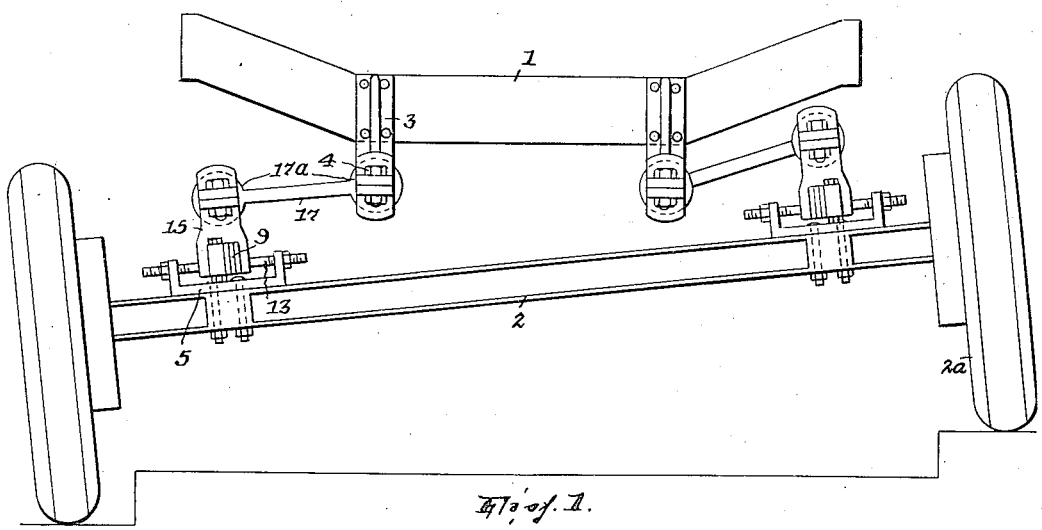
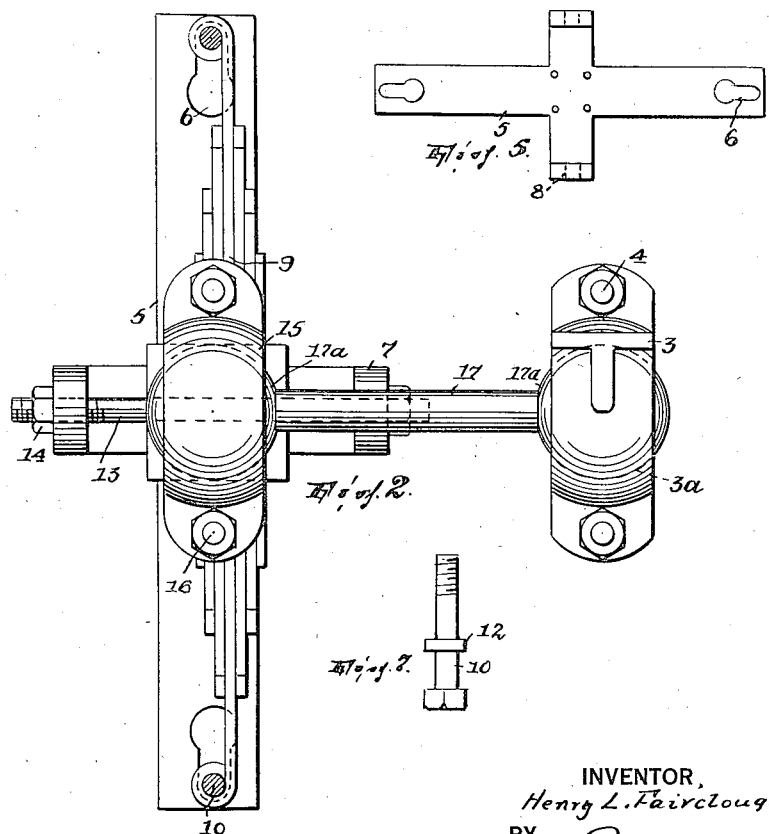
INVENTOR,
Henry L. Fairclough Jr.,
BY
ATTORNEY

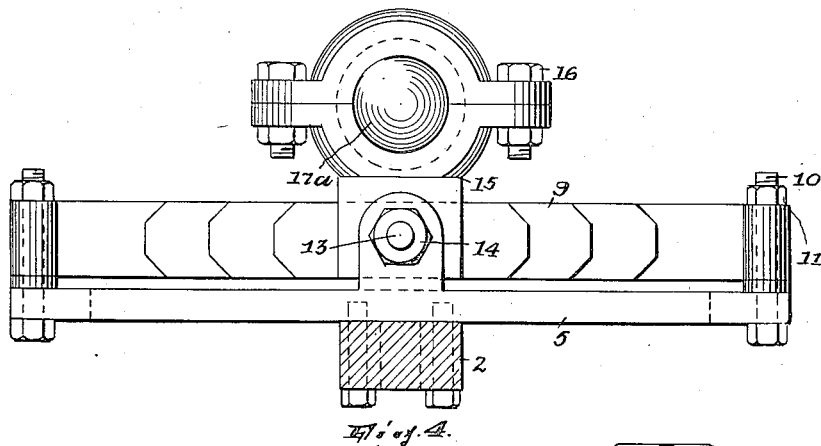
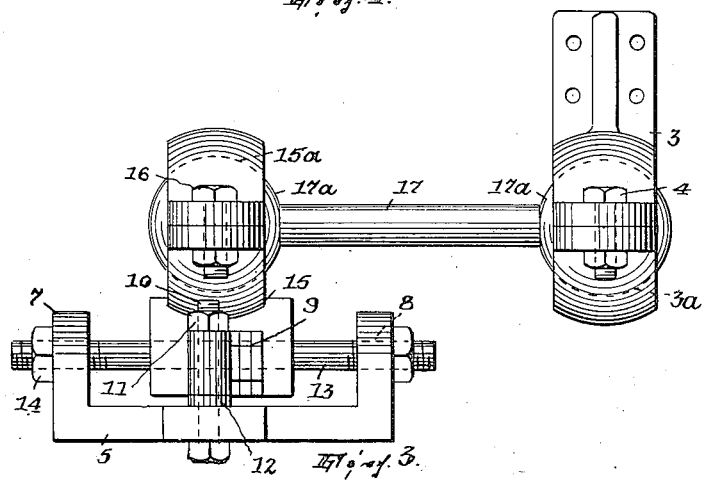
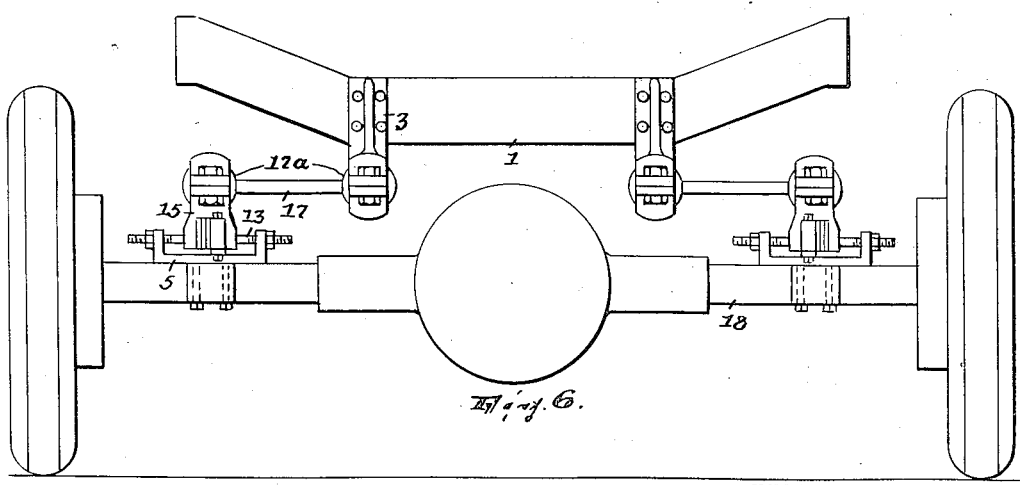

Patented June 16, 1936

2,044,242

UNITED STATES PATENT OFFICE 2,044,242

SPRING SUSPENSION

Henry L. Fairclough, Jr., Clifton, N. J.

Application April 4, 1934, Serial No. 718,938

8 Claims. (Cl. 267—19)

This invention relates to spring-suspensions, and it consists in an improved spring-suspension between a load structure and a load-carrying structure, as of an automobile or other vehicle, characterized by the following salient features, to wit:

That a pair of links projecting oppositely to each other in a lateral direction are each articulatively connected with separate spring means affixed to one of the two structures (the chassis and axle) and arranged to yield laterally and substantially rectilineally and are confined by the respective spring means and the other structure against other than articulative movement relatively thereto.

That coactive spring-including means arranged to yield laterally and to be stressed oppositely to each other by the load structure together form a yielding intermediary between the two structures and are each affixed on the one hand to one structure and articulatively connected on the other hand to the other structure and free of both structures between the points of connection therewith and confined by the latter against other than articulative movement relatively thereto.

If there is the indicated confining then, when the load structure undergoes displacement laterally, by which I mean with reference to the vertical, both springs (and not only one, as has been heretofore proposed) are potential factors in yieldingly resisting such displacement.

In the drawings,

Fig. 1 is a front elevation illustrating the invention as applied to a vehicle whose axle, here the front axle, is shown undergoing vertical displacement by tilting;

Fig. 2 is a plan, Fig. 3 a front elevation, and Fig. 4 a side elevation (with the axle in cross-section) of one of the assemblies embodying the invention;

Fig. 5 is a plan of a bracket forming one of the abutment means;

Fig. 6 shows the invention applied to the rear axle of the vehicle and the parts in normal position;

Fig. 7 shows one of the bolts 10.

Let 1 represent the chassis of the load structure and 2 the front axle of the load-carrying structure of an automobile, the axle having as usual pivoted thereto for steering spindles for the wheels 2a—not shown, as immaterial. The design of each of these structures is of course immaterial.

One of these structures (here the load structure) is equipped with the mentioned abutment means, as the brackets 3 bolted to the chassis, against which are articulatively supported the links, as by each bracket having an internally spherical socket 3a; each bracket is formed in two parts secured together by bolts 4. The other structure has the mentioned abutment means for the spring-devices, as here a pair of brackets 5 each cross-shaped and shown bolted to the axle more or less near each wheel; the long arm of each bracket, extending lengthwise of the vehicle, has end slots 6, here of key-hole form, and the short arm thereof has its ends upbent, as at 7, and provided with holes 8.

Each spring-including means, comprising as indicated a spring-device and a link articulatively connected therewith, is constructed as follows: The spring-device comprises a leaf-spring 9 and a coupling 15. The spring has vertical bolts 10 which penetrate the slots 6 so that the spring-device is supported against transverse displacement bodily by the corresponding abutment means 5 and yet will yield in response to force applied between the ends of the spring; the bolts also have fixed collars 12 between which and nuts 11 the spring ends are clamped and which coact with the bolt heads to confine the bolts to the bracket for sliding movement lengthwise of the slots 6. The wider ends of the slots permit the bolt heads to be passed through the slots in assembling the parts. Each coupling 15 is here formed with a fork which straddles the mid-portion of the spring and with a head having an internally spherical socket 15a, the head or socket portion of the coupling being formed in two parts secured together by bolts 16. The link of each spring-including means is designated 17 and it has at its ends balls 17a received by the sockets 3a and 15a.

For confining the coupling to the spring, and also opposing undesired torsional displacement of the spring, at its mid-portion, there is a guide 13 penetrating the spring and fork-portion of the coupling and with respect to which they may shift, in the flexing of the spring, longitudinally of the guide, such guide being a bolt penetrating the holes 8 of the bracket 5 and clamped in place by nuts 14.

In Fig. 1 the invention is shown with the parts thereof in the position occupied thereby when the load-carrying structure has assumed an abnormal position, or tilted because one wheel has entered a depression and the other mounted an elevation in the road. In Fig. 6 the invention is shown (applied to a rear axle 18) with the load-carrying structure in normal or horizontal position.

I prefer that in the normal (loaded) condition of the parts of the mentioned spring-including means the links should extend in substantial alinement with each other, or substantially horizontally, as shown; thus, in Fig. 2 the spring, shown straight, is assumed to be under load.

Besides reducing the shock incident to both wheels or one wheel encountering some irregularity in the road, as the depression shown at the left or the elevation shown at the right of Fig. 1, involving vertical yield, the yield may be somewhat transversely when the direction of travel is changed laterally, or longitudinally when a sudden stopping or starting of the vehicle occurs. And by interposing the links between them and the structure which they connect with said spring-devices (to wit, elements each movable in an arc) it is possible to form the actual springs of considerably reduced length. The term "spring" as used herein is to be taken to mean any elastic medium.

The term "lateral" or "laterally" as used herein is of course not to be construed as meaning only transversely of the vehicle.

Having thus fully described my invention what I claim is:

1. The combination, with a load structure and a load-carrying structure each having abutment means, of a pair of links articulatively supported against the abutment means of one and free of the other structure and projecting therefrom oppositely to each other and spring-devices arranged to yield laterally and substantially rectilineally and with which the links are articulatively connected supported against the abutment means of the other structure, the links being normally substantially alined with each other.

2. The combination, with a load structure and a load-carrying structure each having abutment means, of a pair of links articulatively supported against the abutment means of one structure for universal movability and projecting therefrom oppositely to each other and spring-devices with which the links are articulatively connected for universal movability supported against the abutment means of the other structure, the links being normally substantially alined with each other.

3. The combination, with the chassis element of a vehicle and an axle-including element, one such element having spaced horizontal fixed portions extending transversely of the axle of said axle-including element, of horizontally extending and laterally yielding leaf-springs attached at their ends respectively to said portions, couplings attached to the respective springs between the ends of the latter, and oppositely extending links pivotally connecting the other element with the respective couplings.

4. The combination, with the chassis element of a vehicle and an axle-including element, one such element having spaced horizontal fixed portions extending transversely of the axle of said axle-including element, of horizontally extending and laterally yielding leaf-springs attached at their ends respectively to said portions, couplings attached to the respective springs between the ends of the latter, and oppositely extending links pivotally connecting the other element with the respective couplings and each having a universal connection with the latter element and corresponding coupling.

5. The combination with a load structure and a load-carrying structure, of separate spring means arranged to yield laterally and substantially rectilineally and affixed to one such structure and links projecting oppositely to each other each in a lateral direction and free of the latter structure and articulatively connected with the respective spring means and the other structure and confined by each of them against other than articulative movement relatively thereto.

6. The combination, with a load structure and a load-carrying structure, of separate spring means affixed to one such structure and links projecting oppositely to each other each in a lateral direction and universally connected with the respective spring means and the other structure and confined by each of them against other than universal movement relatively thereto.

7. The combination, with a load structure and a load-carrying structure, of coactive spring-including means arranged to yield laterally and to be stressed oppositely to each other by the load structure and together forming a yielding intermediary between the two structures and each affixed to one structure and universally connected to the other structure and confined by the latter against other than universal movement relatively thereto.

8. The combination, with a load structure and a load-carrying structure, of coactive spring-including means arranged to yield laterally and to be stressed oppositely to each other by the load structure and together forming a yielding intermediary between the two structures and each affixedly connected to one structure and articulatively connected to the other structure and free of both structures between the points of such connection therewith and confined by the latter structure against other than articulative movement relatively thereto.

HENRY L. FAIRCLOUGH, Jr.

CERTIFICATE OF CORRECTION.

Patent No. 2,044,242.  June 16, 1936.

HENRY L. FAIRCLOUGH, JR.

It is hereby certified that error appears in the printed specification of the above numbered patent requiring correction as follows: Page 1, second column, line 10, after the word "wheel" and before the semicolon insert the comma and words , said brackets thus forming with the axle what I term axle-including element; and that the said Letters Patent should be read with this correction therein that the same may conform to the record of the case in the Patent Office.

Signed and sealed this 15th day of September, A. D. 1936.

Henry Van Arsdale (Seal)  Acting Commissioner of Patents.